(12) United States Patent
Soshin (10) Patent No.: US 9,324,056 B2
(45) Date of Patent: Apr. 26, 2016

(54) MODEL ENTITY NETWORK FOR ANALYZING A REAL ENTITY NETWORK

(75) Inventor: Alexey Soshin, Ramat Gan (IL)

(73) Assignee: SAP Portals Israel Ltd, Ra'anana (IL)

( * ) Notice: Subject to any disclaimer, the term of this patent is extended or adjusted under 35 U.S.C. 154(b) by 477 days.

(21) Appl. No.: 13/535,565

(22) Filed: Jun. 28, 2012

(65) Prior Publication Data

US 2014/0006592 A1 Jan. 2, 2014

(51) Int. Cl.
*G06F 15/173* (2006.01)
*G06Q 10/10* (2012.01)
*G06Q 10/06* (2012.01)
*G06Q 50/00* (2012.01)

(52) U.S. Cl.
CPC .............. *G06Q 10/10* (2013.01); *G06Q 10/06* (2013.01); *G06Q 50/01* (2013.01)

(58) Field of Classification Search
CPC .............. G06F 17/30867; G06F 17/30625; G06F 17/30873; G06Q 50/01; G06Q 30/0269; H04L 67/22; H04L 12/1831; H04L 12/588
USPC ........................................................ 709/244
See application file for complete search history.

(56) References Cited

U.S. PATENT DOCUMENTS

| | | | |
|---|---|---|---|
| 8,527,547 B2 * | 9/2013 | Parida et al. ................... 707/798 |
| 2009/0030927 A1 * | 1/2009 | Cases et al. ................... 707/102 |
| 2009/0198530 A1 * | 8/2009 | O'Sullivan et al. ............... 705/7 |
| 2010/0281035 A1 * | 11/2010 | Carmel et al. ................. 707/749 |
| 2011/0179030 A1 * | 7/2011 | Lee et al. ...................... 707/737 |
| 2011/0208822 A1 * | 8/2011 | Rathod .......................... 709/206 |
| 2011/0295626 A1 * | 12/2011 | Chen et al. ................... 705/7.11 |
| 2012/0254184 A1 * | 10/2012 | Choudhary et al. ........... 707/738 |

OTHER PUBLICATIONS

'Breadth-first search' [online]. Wikipedia, 2010, [retrieved on Jun. 28, 2012]. Retrieved from the Internet: <URL: http://en.wikipedia.org/w/index.php?title=Breadth-first_search&oldid=366146904>, 4 pages.
'Six degrees of separation' [online]. Wikipedia, 2011, [retrieved on Jun. 28, 2012]. Retrieved from the Internet:<URL: http://en.wikipedia.org/wiki/Main_Page>, 9 pages.
'Social network analysis' [online] Wikipedia, 2001, [retrieved on Jun. 28, 2012]. Retrieved from the Internet: <URL: http://en.wikipedia.org/wiki/Main_Page>, 12 pages.
'Web search engine' [online]. Wikipedia, 2011, [retrieved on Jun. 28, 2012]. Retrieved from the Internet: <URL:http://en.wikipedia.org/w/index.php?title=Web_search_engine&oldid=436860476>, 9 pages.
'Idea Place: SAP Community Network' [online]. SAP AG, 2010, [retrieved on Jun. 28, 2012]. Retrieved from the Internet: <URL: https://cw.sdn.sap.com/cw/ideas/4721>, 3 pages.

* cited by examiner

*Primary Examiner* — Ario Etienne
*Assistant Examiner* — Blake Rubin
(74) *Attorney, Agent, or Firm* — Fish & Richardson P.C.

(57) ABSTRACT

Systems and techniques that can be used for analyzing a social network or any other type of entity networks. In an effort to preserve the privacy rights of individuals, a model of a real entity network can be generated that is a balanced representation of the entity network, and various tests can be performed on metadata in the model. For example, the model network can be generated based on only two data portions: the total number of nodes in the network and the number of relations per node.

18 Claims, 4 Drawing Sheets

MODEL ENTITY NETWORK FOR ANALYZING A REAL ENTITY NETWORK

BACKGROUND

This document relates to analyzing entity networks.

Many organizations maintain electronic records of employees, customers, vendors and/or other business partners, to name just a few examples. Sometimes such records can indicate a relation between two or more such entities. For example, for an employee who is a manager the record can indicate the name of any employee who reports to the manager. Based on such information the employee directory can be considered a social network, in that the supervisory role of the manager creates connections with the supervised employees by interactions (e.g., in person, by email, instant message or phone). Other entity networks are sometimes also considered social networks.

SUMMARY

In a first aspect, a computer-implemented method for analyzing an entity network includes: receiving input including a first number (E) corresponding to a number of entities in a real entity network to be analyzed, and a second number (R) corresponding to a number of relations per entity in the real entity network; in response to the input, generating (i) E number of entity entries in an entities table, each entity entry including at least an entity identifier and entity metadata, and (ii) a calculations table including the E number of entity identifiers, each associated with a level value of zero; incrementing every Rth level value in the calculations table by one; determining, using one or more processors, whether more than R number of the level values were incremented in a most recent incrementing step, and if so again performing the incrementing step on those level values, wherein such incrementing and determination are repeated until the determination finds at most R number of recently incremented level values; after the incrementing is finished, creating a model entity network that have the E number of entity entries organized according to their respective level values, the model entity network created by generating a relations table with associations between the E number of entity entries; performing one or more tests on the generated model entity network that involve at least some of the metadata; and modifying the real entity network based on an outcome of the performed test.

In a second aspect, a computer program product is tangibly embodied in a computer-readable storage medium and includes instructions that when executed by a processor perform a method. The method includes: receiving input including a first number (E) corresponding to a number of entities in a real entity network to be analyzed, and a second number (R) corresponding to a number of relations per entity in the real entity network; in response to the input, generating (i) E number of entity entries in an entities table, each entity entry including at least an entity identifier and entity metadata, and (ii) a calculations table including the E number of entity identifiers, each associated with a level value of zero; incrementing every Rth level value in the calculations table by one; determining, using one or more processors, whether more than R number of the level values were incremented in a most recent incrementing step, and if so again performing the incrementing step on those level values, wherein such incrementing and determination are repeated until the determination finds at most R number of recently incremented level values; after the incrementing is finished, creating a model entity network that have the E number of entity entries organized according to their respective level values, the model entity network created by generating a relations table with associations between the E number of entity entries; performing one or more tests on the generated model entity network that involve at least some of the metadata; and modifying the real entity network based on an outcome of the performed test.

In a third aspect, a system includes: one or more processors; and a computer program product comprising instructions that when executed perform a method. The method includes: receiving input including a first number (E) corresponding to a number of entities in a real entity network to be analyzed, and a second number (R) corresponding to a number of relations per entity in the real entity network; in response to the input, generating (i) E number of entity entries in an entities table, each entity entry including at least an entity identifier and entity metadata, and (ii) a calculations table including the E number of entity identifiers, each associated with a level value of zero; incrementing every Rth level value in the calculations table by one; determining, using one or more processors, whether more than R number of the level values were incremented in a most recent incrementing step, and if so again performing the incrementing step on those level values, wherein such incrementing and determination are repeated until the determination finds at most R number of recently incremented level values; after the incrementing is finished, creating a model entity network that have the E number of entity entries organized according to their respective level values, the model entity network created by generating a relations table with associations between the E number of entity entries; performing one or more tests on the generated model entity network that involve at least some of the metadata; and modifying the real entity network based on an outcome of the performed test.

Implementations can include any or all of the following features. The method further includes selecting the metadata based on actual data in the real entity network while preserving privacy of the actual data. Creating the model entity network includes: identifying a first entity entry in the calculation table as having a maximum level value; selecting every entity entry in the calculation table whose level value is one less than the maximum level value, until at most R number of entity entries are selected; and creating relations between each of the selected entity entries and the first entity entry in the relations table. No other entity entry has the maximum level value and the method further includes determining whether any unselected entity entry also has the level value that is one less than the maximum level value, and if so creating a relation between that unselected entry and the first entity entry in the relations table. Performing the one or more tests includes determining whether an asymmetry exists in the real entity network. Performing the one or more tests includes determining whether a redundancy exists in the real entity network. Performing the one or more tests comprises determining whether overcrowding exists in the real entity network.

Implementations can provide any or all of the following advantages. Analysis of entity networks can be improved. A social network can be analyzed without using personal data from any of its members. Results can easily be compared; while comparison of two social networks is complex, only two database tables need to be compared. A balanced network suitable for testing purposes can be created based on only two input parameters.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes example of systems and techniques that can be used for analyzing a social network or any other type of entity networks. In an effort to preserve the privacy rights of individuals, a model of a real entity network can be generated that is a balanced representation of the entity network, and various tests can be performed on metadata in the model. For example, the model network can be generated based on only two data portions: the total number of nodes in the network and the number of relations per node.

Figure 1:
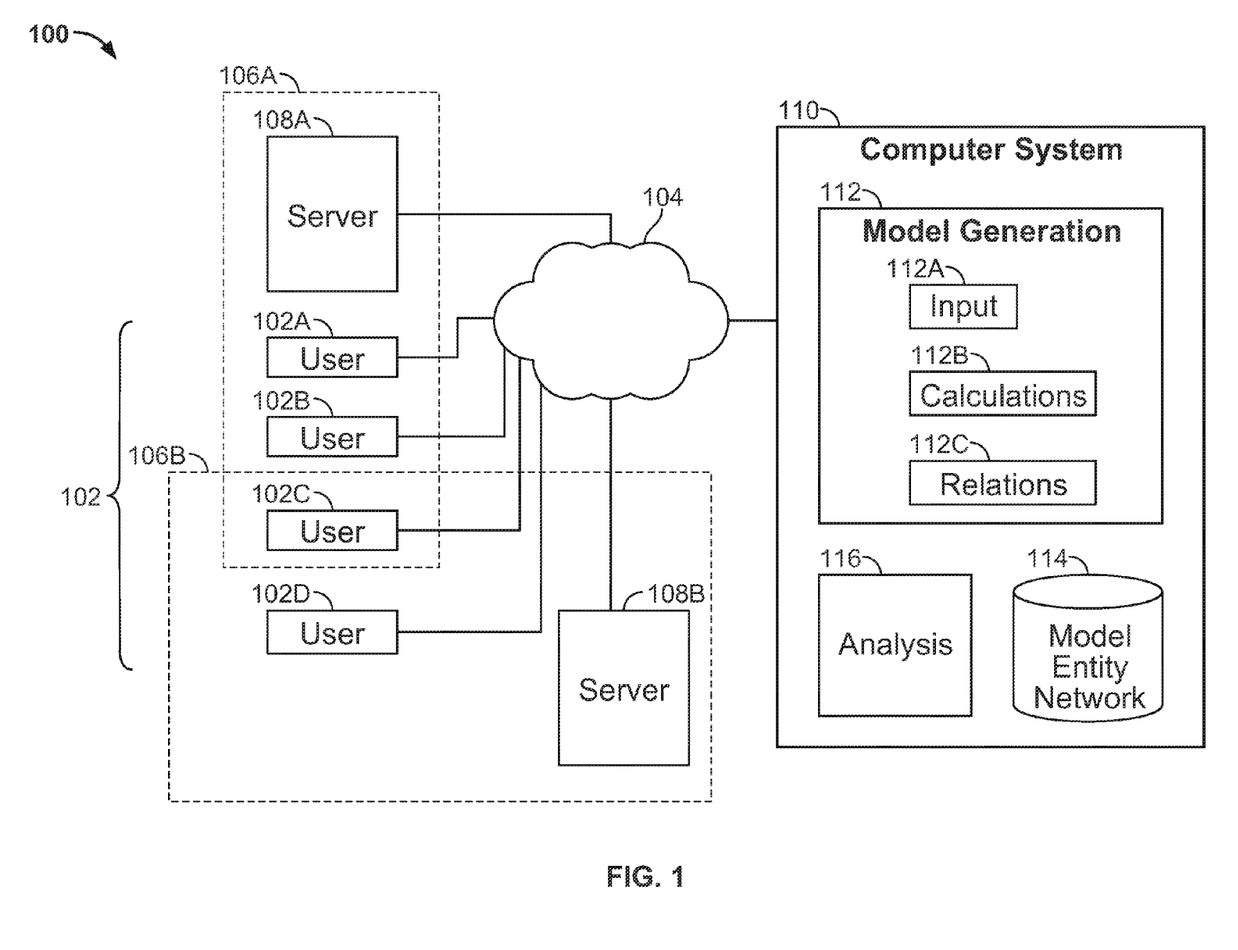
FIG. 1 shows an example of a system that can be used to analyze an entity network.

FIG. 1 shows an example of a system 100 that can be used to analyze an entity network. The system 100 includes multiple user systems 102 that can include any type of device that can connect with a network 104 and exchange information with one or more other network participants. The user systems 102 can include smartphones, cell phones, tablets, handheld computers, laptops, desktop computers or workstations, to name just a few examples. The network 104 can include any type of network, including, but not limited to, a local or wide area network and/or the internet.

Among other functions, each of the user systems 102 can be used for participating in one or more social networks. Here, social networks 106A and 106B are schematically illustrated. For example, the social network 106A can be defined as including all employees of an organization (e.g., a company), and the social network 106B can be a private social initiative that is essentially open for all online user to seek membership in.

Each of the social networks can include one or more servers or other central components for communication and/or processing. For example, the networks 106A-B here include at least server systems 108A-B, respectively. Of the user systems 102, only user systems 102A-C are here part of the social network 106A, and only the user systems 102C-D are here part of the social network 106B. In some implementations, a user system can be regarded as belonging to any arbitrary social network (or any other entity network) based on the user logging into the social or entity network from that system.

In the system 100, modeling and analysis can be performed with regard to the social network 106A or B, or with regard to any other entity network. Here, the system 100 includes a computer system 110 that can be used for such modeling and analysis. The computer system 110 can be implemented using one or more physical devices (e.g., a server) of any type that is suitable for the processing to be performed.

Here, the computer system 110 includes a model generation component 112 that can be used for generating one or more model entity networks (MEN) 114. In some implementations, the MEN 114 is a model of an entity network corresponding to a company organizational structure (e.g., the social network 106A), or of an entity network designed for online users to socially interact with each other (e.g., the social network 106B).

The model generation component 112 includes an input module 112A that a user can operate to make the input(s) necessary for generating the MEN 114. A total number of entities, a number of relations per entity, entity names and/or entity metadata, can be entered, to name just a few examples. Template names, and not actual names, are entered in some implementations. For example, the user can specify that all entities will get names corresponding to "FirstX LastY," but the user does not specify that any particular entity will be named, say, "John Brown". In some implementations, a range of relations can be entered. For example, the user can specify that "between three and six relations per entity" should be used. The actual number of relations in such a case can be calculated in a random way. A calculations module 112B can be used to perform the calculation(s) necessary for generating the MEN 114. A relations module 112C can be used for defining, organizing and storing the relations that make up the MEN 114.

When the MEN 114 has been generated, an analysis component 116 can be used for performing one or more types of analysis on the MEN 114. In some implementations, the MEN 114 can be checked for asymmetry, redundancy and/or overcrowding. Next an example of generating a model entity network will be described.

Figure 2:
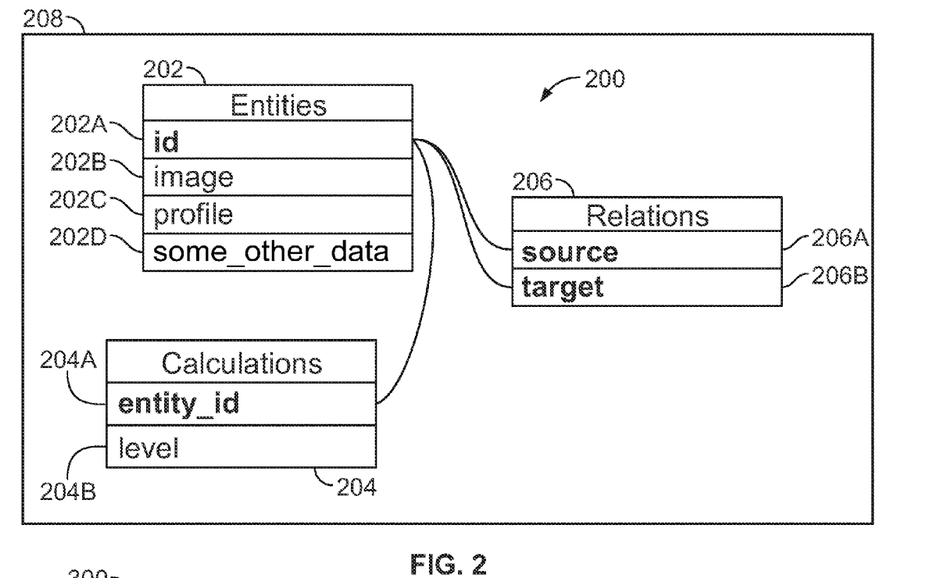
FIG. 2 shows an example of database tables that can be used in generating a model entity network.

FIG. 2 shows an example of database tables 200 that can be used in generating a model entity network. An entities table 202 includes at least: an identifier (id) field 202A, and a profile field 202C. In some implementations, the entities table 200 can include one or more additional fields, such as an image field 202B and one or more other fields 202D, here labeled "some_other_data". This represents an arbitrary unknown number of additional fields, depending on the type of social network and the implementation. Each entry in the entities field 202 will correspond to one entity that is a member of the entity network to be modeled. For example in FIG. 1, based on the user system 102A being part of the social network 106A, that user system would have an entry in the entities table 202 when a model for the social network is generated.

A calculations table 204 includes at least: an entity_id field 204A and a level field 204B. Each entry in the calculations table 204 will indicate the level value that is currently assigned to a particular entity. For example in FIG. 1, if the server 108B is considered the highest node in the social network 106B, then the entity entry corresponding to that server would have a highest level value in the calculations table 204. As the name indicates, the calculations table 204 will be used for calculations in the process of generating the model entity network. For example, during such calculations the level value assigned to any of the entity entries can change.

A relations table 206 includes at least: a source field 206A and a target field 206B. For example when two entity entries have been given adjacent level values in the calculations table 204, a relation between those entity entries can be created in the relations table 206.

The database tables 200 can be stored in any suitable database repository 208. Here, the database tables 200 are stored entirely or mainly in memory, as opposed to on disk, etc. Using in-memory techniques can speed up the access and retrieval of data, and can therefore help provide the quick turnaround time needed for making recommendations essentially in real time. For example, the HANA™ platform available from SAP AG uses in-memory database technology and can be used as the database repository 208.

The following is an example of generating a model entity network. In some implementations, the input module 112A (FIG. 1) receives two parameters: a number of entities in the network (here referred to as ENTS) and a number of relations per entity (here referred to as RELS). In this example, ENTS=17 and RELS=2. That is, the model entity network should be created to have 17 entities, with the goal of an entity being related to two other entities.

First the entries can be inserted into the entities table 202. Then the calculations table 204 can be filled accordingly. For example, the following pseudo-code illustrates operations performed on the calculations table:

```
for (i=0; i<ENTS; i++)
{
    insert into CALCULATIONS (entity_id, level) values (i,0);
}
```

This corresponds to assigning level zero to all entity entries. Here, the calculations table 204 now includes:

| LEVEL | ENTITY_ID |
|---|---|
| 0 | 1 |
| 0 | 2 |
| 0 | 3 |
| 0 | 4 |
| 0 | 5 |
| 0 | 6 |
| 0 | 7 |
| 0 | 8 |
| 0 | 9 |
| 0 | 10 |
| 0 | 11 |
| 0 | 12 |
| 0 | 13 |
| 0 | 14 |
| 0 | 15 |
| 0 | 16 |
| 0 | 17 |

Next, every Nth entry in the calculations table is increased, where N equals RELS. For example, the following pseudo-code illustrates operations performed on the calculations table:

```
Index = 1;
For (entity_id in CALCULATIONS)
{
    If (mod(index, RELS) = 0)
    {
        UPDATE CALCULATIONS
        SET LEVEL = LEVEL + 1
        WHERE ENTITY_ID = entity_id;
    }
    Index = index + 1;
}
```

In the current example, every second entry (because RELS=2) is incremented, thus:

| LEVEL | ENTITY_ID |
|---|---|
| 0 | 1 |
| 1 | 2 |
| 0 | 3 |
| 1 | 4 |
| 0 | 5 |
| 1 | 6 |
| 0 | 7 |
| 1 | 8 |
| 0 | 9 |
| 1 | 10 |
| 0 | 11 |
| 1 | 12 |
| 0 | 13 |
| 1 | 14 |
| 0 | 15 |
| 1 | 16 |
| 0 | 17 |

Next, it is determined how many entities were incremented in the previous operation. That is, the entries having level value one are identified. For example, the following pseudo-code illustrates operations performed on the calculations table:

```
SELECT count FROM CALCULATIONS WHERE LEVEL = 1;
If (count > RELS)
{
    LEVEL = LEVEL + 1;
    CALCULATIONS = SELECT * FROM CALCULATIONS
WHERE LEVEL = LEVEL;
    Do first step again
}
```

If the number of such entries is equal to or greater than RELS, then incrementing continues. Here, entries 2, 4, 6, 8, 10, 12, 14 and 16 (eight entries) were incremented, so the process continues by again selecting every Nth entry among those. That is, in this example, every second one of the recently incremented entries is selected, and again incremented by one. This creates the following calculations table:

| LEVEL | ENTITY_ID |
|---|---|
| 0 | 1 |
| 1 | 2 |
| 0 | 3 |
| 2 | 4 |
| 0 | 5 |
| 1 | 6 |
| 0 | 7 |
| 2 | 8 |
| 0 | 9 |
| 1 | 10 |
| 0 | 11 |
| 2 | 12 |
| 0 | 13 |
| 1 | 14 |
| 0 | 15 |
| 2 | 16 |
| 0 | 17 |

That is, entries 4, 8, 12 and 16 (four entries) were incremented this time. Because four is equal to or greater than RELS in this example (RELS=2), the incrementing continues. That is, every second one of the most recently incremented entries (i.e., those with level value equal to two) is again incremented by one, so that the calculations table becomes:

| LEVEL | ENTITY_ID |
|---|---|
| 0 | 1 |
| 1 | 2 |
| 0 | 3 |
| 2 | 4 |
| 0 | 5 |
| 1 | 6 |
| 0 | 7 |
| 3 | 8 |
| 0 | 9 |
| 1 | 10 |
| 0 | 11 |
| 2 | 12 |
| 0 | 13 |
| 1 | 14 |
| 0 | 15 |
| 3 | 16 |
| 0 | 17 |

That is, entries 8 and 16 (two entries) were incremented this time. Because two is equal to or greater than RELS in this example (RELS=2), the incrementing continues. That is, every second one of the most recently incremented entries (i.e., those with level value equal to three) is again incremented by one, so that the calculations table becomes:

| LEVEL | ENTITY_ID |
|---|---|
| 0 | 1 |
| 1 | 2 |
| 0 | 3 |
| 2 | 4 |
| 0 | 5 |
| 1 | 6 |
| 0 | 7 |
| 3 | 8 |
| 0 | 9 |
| 1 | 10 |
| 0 | 11 |
| 2 | 12 |
| 0 | 13 |
| 1 | 14 |
| 0 | 15 |
| 4 | 16 |
| 0 | 17 |

That is, entry 16 is incremented this time. Because one entry is not equal to or greater than RELS in this example (RELS=2), the incrementing stops at this point and the calculations table 204.

Next, the entry or entries having the maximum level number are identified. In this example, entity 16 has the highest level value (equal to four). Based on that maximum level number, the next lower level number (in this example, three) is sought. Particularly, the process seeks to identify RELS number of entities having the next lower level value. In this example, only entity 8 has a level value equal to three. Therefore, a corresponding entry is made in the relations table 206 to associate entity 8 with entity 16. For example, the following pseudo-code illustrates operations performed on the relations table:

```
For (entity in entities_under_me)
{
    INSERT INTO RELATIONS (SOURCE, TARGET)
    VALUES (entity_above, entity);
}
```

The relations table can then contain the following:

| TARGET | SOURCE |
|---|---|
| 8 | 16 |

Next, the process takes each entity with that level value (three in this example) and looks for RELS number of entities have the next lower level value. In this example, that lower level value is two, and the entries 2 and 4 have that level value. Thus, the relations table becomes:

| TARGET | SOURCE |
|---|---|
| 8 | 16 |
| 12 | 8 |
| 4 | 8 |

Next, the process takes each entity with that level value (two in this example) and looks for RELS number of entities have the next lower level value. In this example, that lower level value is one, and the entries 2, 6, 10 and 14 have that level value. Of those, two are selected and the relations table becomes:

| TARGET | SOURCE |
|---|---|
| 8 | 16 |
| 12 | 8 |
| 4 | 8 |
| 2 | 12 |
| 6 | 12 |

Next, the process takes entity 4, which also has level value two, and selects the remaining entries that have the next lower level value, so that the relations table becomes:

| TARGET | SOURCE |
|---|---|
| 8 | 16 |
| 12 | 8 |
| 4 | 8 |
| 2 | 12 |
| 6 | 12 |
| 10 | 4 |
| 14 | 4 |

Having checked that there are no unassigned entities with the current level value (that is all entries with level value one have been assigned), the process moves to the next lower level value, which in this example is zero. It does so by four iterations over the respective entities with level value one (that is, entities 2, 6, 10 and 14). Here, because RELS=2, two entities are identified in a first iteration and the relations table becomes:

| TARGET | SOURCE |
|---|---|
| 8 | 16 |
| 12 | 8 |
| 4 | 8 |
| 2 | 12 |
| 6 | 12 |
| 10 | 4 |
| 14 | 4 |
| 1 | 2 |
| 3 | 2 |

In a second iteration, two additional entries with level value zero are found and the relations table becomes:

| TARGET | SOURCE |
|---|---|
| 8 | 16 |
| 12 | 8 |
| 4 | 8 |
| 2 | 12 |
| 6 | 12 |
| 10 | 4 |
| 14 | 4 |
| 1 | 2 |
| 3 | 2 |
| 5 | 6 |
| 7 | 6 |

In a third iteration, two additional entries with level value zero are found and the relations table becomes:

| TARGET | SOURCE |
|---|---|
| 8 | 16 |
| 12 | 8 |
| 4 | 8 |
| 2 | 12 |
| 6 | 12 |
| 10 | 4 |
| 14 | 4 |
| 1 | 2 |
| 3 | 2 |
| 5 | 6 |
| 7 | 6 |
| 9 | 10 |
| 11 | 10 |

In a fourth iteration, two additional entries with level value zero are found and the relations table becomes:

| TARGET | SOURCE |
|---|---|
| 8 | 16 |
| 12 | 8 |
| 4 | 8 |
| 2 | 12 |
| 6 | 12 |
| 10 | 4 |
| 14 | 4 |
| 1 | 2 |
| 3 | 2 |
| 5 | 6 |
| 7 | 6 |
| 9 | 10 |
| 11 | 10 |
| 13 | 14 |
| 15 | 14 |

In this example, after the iterations over all entities with level value one are complete, one entity with level value zero remains (entity 17). That entity is then assigned to the last entity that has level value one, and the relations table finally becomes:

| TARGET | SOURCE |
|---|---|
| 8 | 16 |
| 12 | 8 |
| 4 | 8 |
| 2 | 12 |
| 6 | 12 |
| 10 | 4 |
| 14 | 4 |
| 1 | 2 |
| 3 | 2 |
| 5 | 6 |
| 7 | 6 |
| 9 | 10 |
| 11 | 10 |
| 13 | 14 |
| 15 | 14 |
| 17 | 14 |

Figure 3:
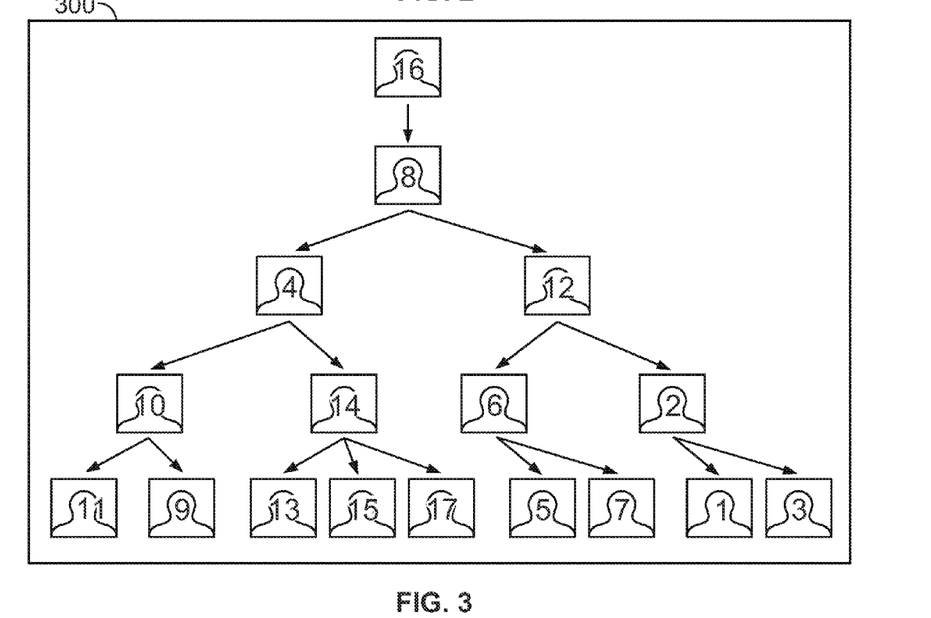
FIG. 3 shows an example of a model entity network.

FIG. 3 shows an example of a model entity network 300. Particularly, the model entity network 300 can be generated as a visual representation based on the above example. The model entity network 300 includes the 17 entities organized based on the parameter RELS=2, meaning that each entity should have up to two other entities assigned to it. The single exception to that rule in the current example is that three entities (numbers 13, 15 and 17) are assigned to the entity 14. Nevertheless, the model entity network 300 is a balanced and useful model that can be analyzed to gain insight into the nature of a real entity network (e.g., a social network).

Figure 4:
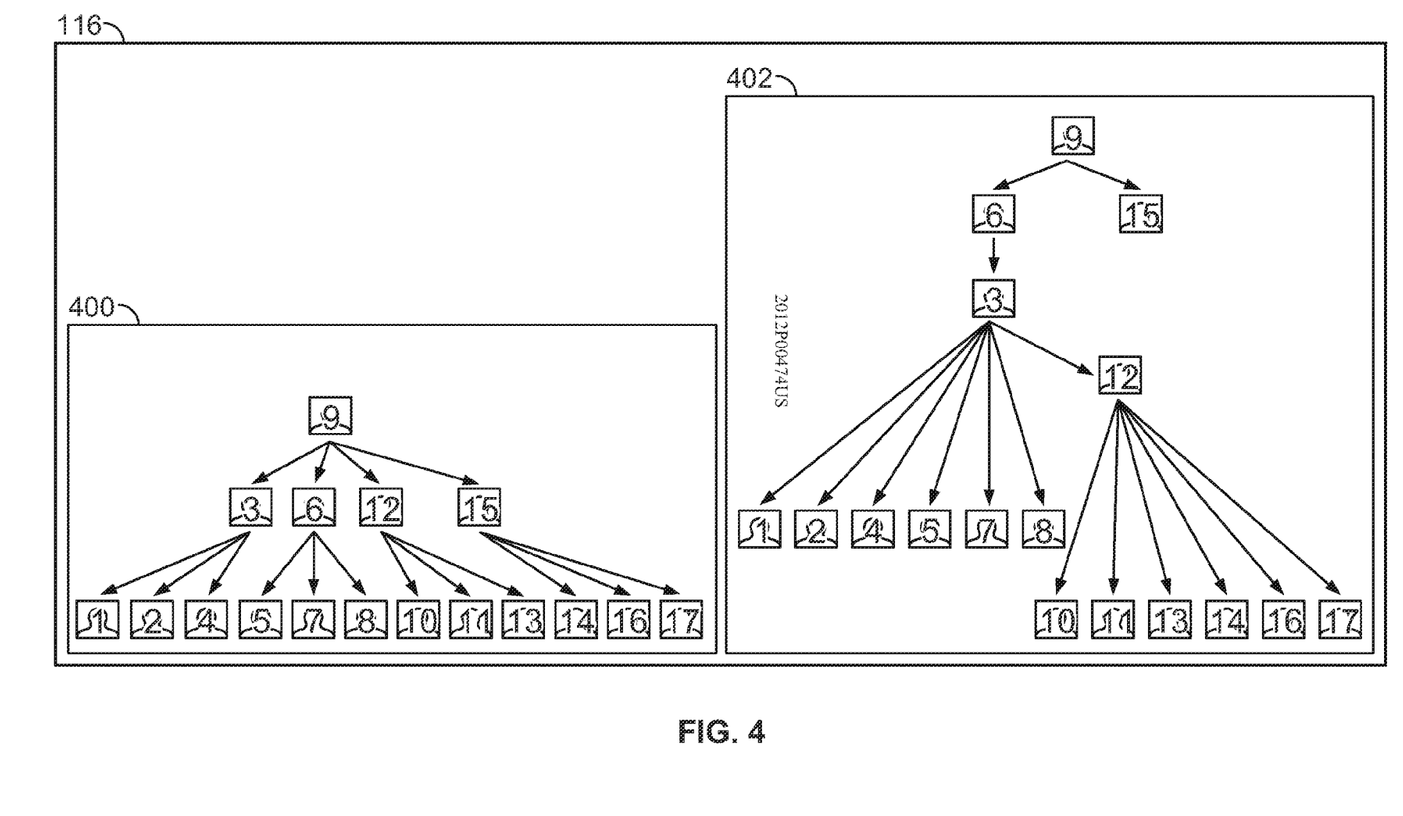
FIG. 4 shows an example of using a model entity network to analyze a real entity network.

FIG. 4 shows an example of using a model entity network 400 to analyze a real entity network 402. First, there will be described an example of generating the model entity network 400 and thereafter the analysis will be exemplified.

In this example, the parameters ENTS=17 and RELS=3 are received. The processing essentially continues by: assigning a lowest level value to all entities (e.g., level value zero); incrementing every Nth entity (where N=RELS=3) by one; because the incremented entities are equal to or greater than RELS, every Nth entity of them is again incremented (to level value two); and because only one entity is incremented in the most recent step, the incrementing ends. At that point, the calculation table 204 (FIG. 2) is compete and may contain:

| LEVEL | ENTITY_ID |
|---|---|
| 0 | 1 |
| 0 | 2 |
| 1 | 3 |
| 0 | 4 |
| 0 | 5 |
| 1 | 6 |
| 0 | 7 |
| 0 | 8 |
| 2 | 9 |
| 0 | 10 |
| 0 | 11 |
| 1 | 12 |
| 0 | 13 |
| 0 | 14 |
| 1 | 15 |
| 0 | 16 |
| 0 | 17 |

Next, the maximum level value is found (equal to two in this example), which is assigned to entity 9, and the next lower value is identified (i.e., level value one). For RELS number of entities having this number, a corresponding relation is entered in the relations table 206 (FIG. 2). Because no additional entities have the maximum value, the check continues with the next lower level value, and one unassigned entity is found (namely entity 15). This entity is inserted under the entity that most recently had an entity assigned to it (i.e., entity 9).

The process is then repeated for the level value one until all entities in the entities table 202 (FIG. 2) occur in the TARGET column of the relations table; that is, until every entity (except the top entity) has a relation to one entity above it. The relation table at that point may contain the following for the model entity network 400:

| TARGET | SOURCE |
|--------|--------|
| 3  | 9  |
| 6  | 9  |
| 12 | 9  |
| 15 | 9  |
| 1  | 3  |
| 2  | 3  |
| 4  | 3  |
| 5  | 6  |
| 7  | 6  |
| 8  | 6  |
| 10 | 12 |
| 11 | 12 |
| 13 | 12 |
| 14 | 15 |
| 16 | 15 |
| 17 | 15 |

That is, the model entity network 400 includes the 17 entities organized based on the parameter RELS=3, meaning that each entity should have up to three other entities assigned to it. The single exception to that rule in the current example is that four entities (numbers 3, 6, 12 and 15) are assigned to the entity 9. Nevertheless, the model entity network 400 is a balanced and useful model that can be analyzed to gain insight into the nature of the real entity network 402.

In some implementations, the analysis component 116 can compare the networks 400 and 402 and produce one or more analysis results. For example, it can be observed that in the real entity network 402, the entity 6 may be redundant; for example, perhaps entity 3 could be related directly to the entity 9 instead. As another example, it can be observed that the entity 15 does not have any entities below it, so that an asymmetry exists with regard to the other entity (number 6) that has a similar position in the network. The entity 3, on the other hand may be considered overcrowded given the target to have three relations per entity, as may the entity 12. As another example, the real entity network 402 is seen to have five levels, whereas the model entity network 400 has three levels. Other analysis can be performed.

In some implementations, one wishes to store data from an existing entity network (e.g., Facebook or LinkedIn) and either analyze or display that data. Particularly, tests should be performed on the structure of the social network, preferably without using the actual data of individuals, due to privacy concerns and other reasons. Therefore suitable metadata about fictitious entities can be assembled and stored in the entities table 202 (FIG. 2), for example using the input module 112A (FIG. 1), and this non-personal data (e.g., demographics, images, audio, video, text, etc.) can then be part of the analysis. For example, the metadata can be selected so that it approximately represents the variety of data occurring in the real entity network. That is, with knowledge about how many entities are registered in a particular entity network and the number of connections per entry (e.g., the number of friends in Facebook), a model entity network can be created that resembles the actual entity network for testing purposes.

Figure 5:
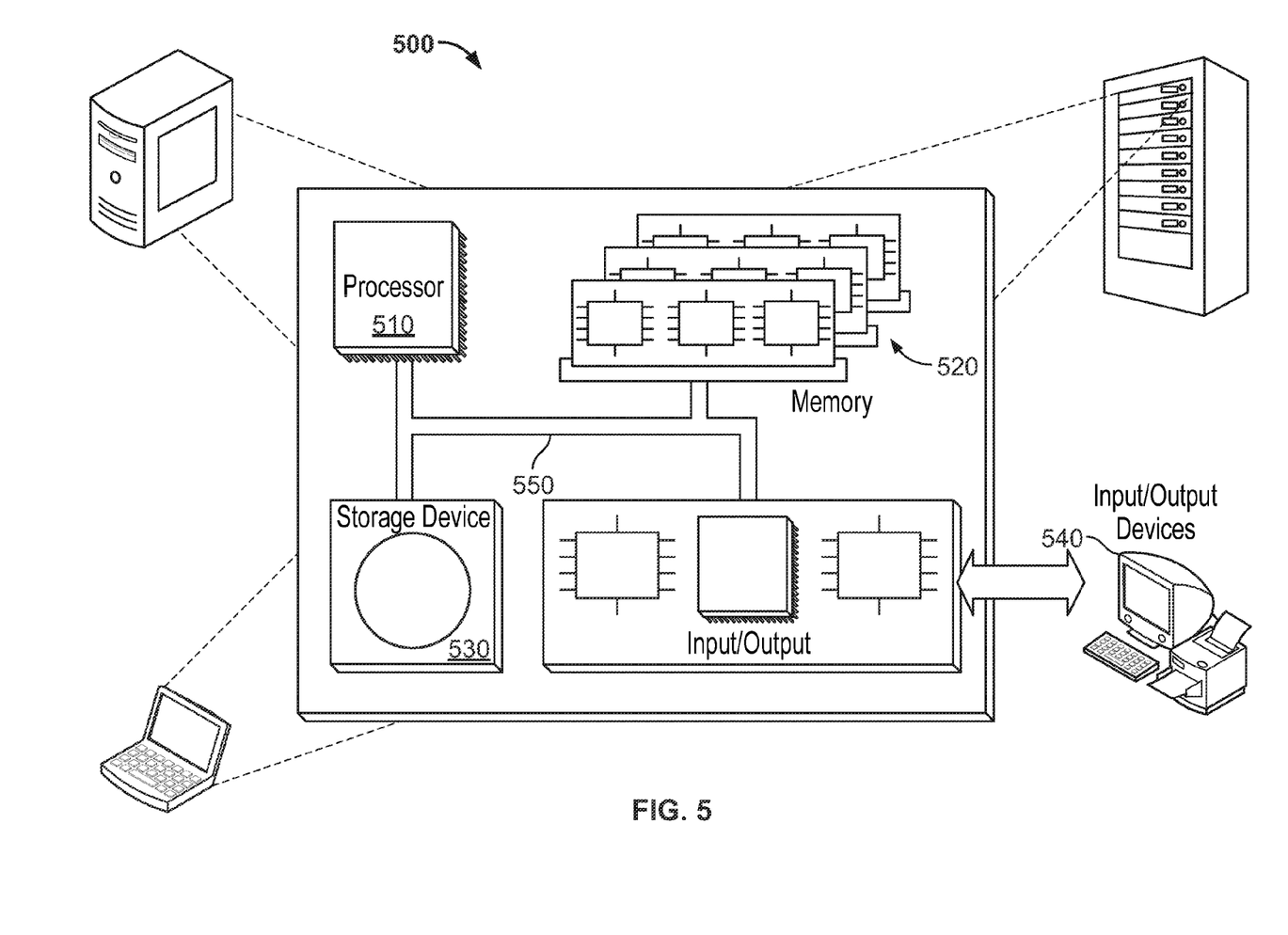
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 420 or on the storage device 530 to display graphical information for a user interface on the input/output device 540.

The memory 520 stores information within the system 400. In some implementations, the memory 520 is a computer-readable medium. The memory 520 is a volatile memory unit in some implementations and is a non-volatile memory unit in other implementations.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for analyzing an entity network, the method comprising:
  receiving, at a computing system, a request to create a computer-generated representation of a model entity network that models a real entity network in the real world, wherein the real entity network comprises a representation of an organization having a plurality of entities, wherein the model entity network identifies an optimal hierarchy of relationships among the plurality of entities in the real entity network;
  receiving, at the computing system, at least two parameters that are to be used in the creation of the computer-generated representation of the model entity network, the at least two parameters including:
    (i) a first number (E) that specifies a number of entities that exist in the real entity network and that are to be represented in the model entity network, and
    (ii) a second number (R) that specifies a maximum number of children that any entity represented in the model entity network should have within the optimal hierarchy of relationships;
  creating, at the computing system and in response to receiving the request and the at least two parameters, the computer-generated representation of the model entity network by:
    (i) generating E number of entity entries in an entities table, each entity entry including at least an entity identifier,
    (ii) generating, for each entity entry in the entities table, a corresponding entry in a calculations table that is distinct from the entities table, the corresponding entry in the calculations table including (a) a level value and (b) the entity identifier for the corresponding entity entry in the entities table,
    (iii) assigning an initial value of zero to the level value for each of the entries in the calculations table,
    (iv) performing a first incrementing operation that includes incrementing by one the respective level value for every Rth entry in the calculations table,
    (v) performing a series of additional incrementing operations that each includes:
      (a) selecting a group of entries in the calculations table, the group including all entries in the calculations table whose level value was incremented in a most-recently performed incrementing operation, the group of entries excluding all entries in the calculations table whose level value was not incremented in the most-recently performed incrementing operation, and
      (b) incrementing by one the respective level value for every Rth entry in the selected group of entries,
    (vi) ceasing to perform additional incrementing operations in the series of additional incrementing operations in response to identifying that a total number of entries in the calculations table whose level value was incremented in the most-recently performed incrementing operation is less than or equal to R,
    (vii) determining, based on the level values, the optimal hierarchy of relationships for the plurality of entities in the real entity network;
  comparing the computer-generated representation of the model entity network to a representation of the real entity network to determine one or more deficiencies that exist in the real entity network; and
  providing, by the computing system and based on a result of the comparing, an indication to modify the real entity network so as to correct the one or more deficiencies determined to exist in the real entity network.

2. The computer-implemented method of claim 1, wherein:
  each entity entry in the entities table further includes metadata that indicates one or more real-world characteristics of a corresponding entity from the real entity network; and
  the method further comprises selecting the entity metadata from actual data in the real entity network for the corresponding entities, the entity metadata being selected so as to preserve privacy interests of the corresponding entities in the real entity network by omitting from the selected metadata portions of the actual data from the real entity network that are determined to relate to private concerns of the corresponding entities in the real entity network.

3. The computer-implemented method of claim 1, wherein determining the optimal hierarchy of relationship for the plurality of entities in the real entity network comprises generating a relations table, distinct from the entities table and the calculations table, that specifies relationship among the plurality of entity entries.

4. The computer-implemented method of claim 3, wherein creating the computer-generated representation of the model entity network comprises:
  identifying a first entity entry in the calculations table as having a maximum level value;
  selecting every entity entry in the calculations table whose level value is one less than the maximum level value, until at most R number of entity entries are selected; and
  creating, for each of the selected entity entries, a respective relationship entry in the relations table between the selected entity entry and the first entity entry.

5. The computer-implemented method of claim 4, further comprising:
selecting every entity entry in the calculations table whose level value is two less than the maximum level value; and
creating, for each of the selected entity entries, a respective relationship entry in the relations table between the selected entity entry and one of the entity entries whose level value is one less than the maximum level value, wherein the relationship entries are distributed so that none of the entity entries whose level value is one less than the maximum value is related to more than R of the entity entries whose level value is two less than the maximum level value.

6. The computer-implemented method of claim 1, wherein comparing the computer-generated representation of the model entity network to the representation of the real entity network comprises determining whether an asymmetry deficiency exists in the real entity network, in that at least two sibling entities in a common level of a hierarchy of the real entity network have different numbers of children entities in the hierarchy, where no such difference exists among corresponding sibling entities represented in the model entity network.

7. The computer-implemented method of claim 1, wherein comparing the computer-generated representation of the model entity network to the representation of the real entity network comprises determining whether a redundancy deficiency exists in the real entity network, in that one or more entities in the real entity network comprise an intermediate level in a hierarchy of the real entity network where no such intermediate level exists in the optimal hierarchy of the model entity network.

8. A computer program product tangibly embodied in a non-transitory computer-readable storage medium and comprising instructions that when executed by a processor perform a method comprising:
receiving a request to create a computer-generated representation of a model entity network that models a real entity network in the real world, wherein the real entity network comprises a representation of an organization having a plurality of entities, wherein the model entity network identifies an optimal hierarchy of relationships among the plurality of entities in the real entity network;
receiving at least two parameters that are to be used in the creation of the computer-generated representation of the model entity network, the at least two parameters including:
(i) a first number (E) that specifies a number of entities that exist in the real entity network and that are to be represented in the model entity network, and
(ii) a second number (R) that specifies a maximum number of children that any entity represented in the model entity network should have within the optimal hierarchy of relationships;
creating, in response to receiving the request and the at least two parameters, the computer-generated representation of the model entity network by:
(i) generating E number of entity entries in an entities table, each entity entry including at least an entity identifier,
(ii) generating, for each entity entry in the entities table, a corresponding entry in a calculations table that is distinct from the entities table, the corresponding entry in the calculations table including (a) a level value and (b) the entity identifier for the corresponding entity entry in the entities table,
(iii) assigning an initial value of zero to the level value for each of the entries in the calculations table,
(iv) performing a first incrementing operation that includes incrementing by one the respective level value for every Rth entry in the calculations table,
(v) performing a series of additional incrementing operations that each includes:
(a) selecting a group of entries in the calculations table, the group including all entries in the calculations table whose level value was incremented in a most-recently performed incrementing operation, the group of entries excluding all entries in the calculations table whose level value was not incremented in the most-recently performed incrementing operation, and
(b) incrementing by one the respective level value for every Rth entry in the selected group of entries,
(vi) ceasing to perform additional incrementing operations in the series of additional incrementing operations in response to identifying that a total number of entries in the calculations table whose level value was incremented in the most-recently performed incrementing operation is less than or equal to R,
(vii) determining, based on the level values, the optimal hierarchy of relationships for the plurality of entities in the real entity network;
comparing the computer-generated representation of the model entity network to a representation of the real entity network to determine one or more deficiencies that exist in the real entity network; and
providing, based on a result of the comparing, an indication to modify the real entity network so as to correct the one or more deficiencies determined to exist in the real entity network.

9. The computer program product of claim 8, wherein:
each entity entry in the entities table further includes metadata that indicates one or more real-world characteristics of a corresponding entity from the real entity network; and
the method further comprises selecting the entity metadata from actual data in the real entity network for the corresponding entities, the entity metadata being selected so as to preserve privacy interests of the corresponding entities in the real entity network by omitting from the selected metadata portions of the actual data from the real entity network that are determined to relate to private concerns of the corresponding entities in the real entity network.

10. The computer program product of claim 8, wherein determining the optimal hierarchy of relationships for the plurality of entities in the real entity network comprises generating a relations table, distinct from the entities table and the calculations table, that specifies relationships among the plurality of entity entries.

11. The computer program product of claim 10, wherein creating the computer-generated representation of the model entity network comprises:
identifying a first entity entry in the calculations table as having a maximum level value;
selecting every entity entry in the calculations table whose level value is one less than the maximum level value, until at most R number of entity entries are selected; and
creating, for each of the selected entity entries, a respective relationship entry in the relations table between the selected entity entry and the first entity entry.

12. The computer program product of claim 11, further comprising:
  selecting every entity entry in the calculations table whose level value is two less than the maximum level value; and
  creating, for each of the selected entity entries, a respective relationship entry in the relations table between the selected entity entry and one of the entity entries whose level value is one less than the maximum level value,
  wherein the relationship entries are distributed so that none of the entity entries whose level value is one less than the maximum value is related to more than R of the entity entries whose level value is two less than the maximum level value.

13. The computer program product of claim 8, wherein comparing the computer-generated representation of the model entity network to the representation of the real entity network comprises determining whether an asymmetry deficiency exists in the real entity network, in that at least two sibling entities in a common level of a hierarchy of the real entity network have different numbers of children entities in the hierarchy, where no such difference exists among corresponding sibling entities represented in the model entity network.

14. The computer program product of claim 8, wherein comparing the computer-generated representation of the model entity network to the representation of the real entity network comprises determining whether a redundancy deficiency exists in the real entity network, in that one or more entities in the real entity network comprise an intermediate level in a hierarchy of the real entity network where no such intermediate level exists in the optimal hierarchy of the model entity network.

15. A system comprising: one or more processors; and
  a non-transitory computer program product comprising instructions that when executed perform a method comprising:
  receiving a request to create a computer-generated representation of a model entity network that models a real entity network in the real world, wherein the real entity network comprises a representation of an organization having a plurality of entities, wherein the model entity network identifies an optimal hierarchy of relationships among the plurality of entities in the real entity network;
  receiving at least two parameters that are to be used in the creation of the computer generated representation of the model entity network, the at least two parameters including:
  (i) a first number (E) that specifies a number of entities that exist in the real entity network and that are to be represented in the model entity network, and
  (ii) a second number (R) that identifies specifies a maximum number of children that any entity represented in the model entity network should have within the optimal hierarchy of relationships;
  creating, in response to receiving the request and the at least two parameters, the computer-generated representation of the model entity network by:
  (i) generating E number of entity entries in an entities table, each entity entry including at least an entity identifier,
  (ii) generating, for each entity entry in the entities table, a corresponding entry in a calculations table that is distinct from the entities table, the corresponding entry in the calculations table including (a) a level value and (b) the entity identifier for the corresponding entity entry in the entities table,
  (iii) assigning an initial value of zero to the level value for each of the entries in the calculations table,
  iv) performing a first incrementing operation that includes consists of incrementing by one the respective level value for every Rth entry in the calculations table,
  v) performing a series of additional incrementing operations that each includes:
    (a) selecting a group of entries in the calculations table, the group including all entries in the calculations whose level value was incremented in a most-recently performed incrementing operation, the group of entries excluding all entries in the calculations table whose level value was not incremented in the most-recently performed incrementing operation, and
    (b) incrementing by one the respective level value for every Rth entry in the selected group of entries,
  vi) ceasing to perform additional incrementing operations in the series of additional incrementing operations in response to identifying that a total number of entries in the calculations table whose level value was incremented in the most-recently performed incrementing operation is less than or equal to R,
  (vii) determining, based on the level values, the optimal hierarchy of relationships for the plurality of entities in the real entity network;
  comparing the computer-generated representation of the model entity network to a representation of the real entity network to determine one or more deficiencies that exist in the real entity network; and
  providing, based on a result of the comparing, an indication to modify the real entity network so as to correct the one or more deficiencies determined to exist in the real entity network.

16. The system of claim 15, wherein determining the optimal hierarchy of relationships for the plurality of entities in the real entity network comprises generating a relations table, distinct from the entities table and the calculations table, that specifies relationships among the plurality of entity entries.

17. The system of claim 16, wherein creating the computer-generated representation of the model entity network comprises:
  identifying a first entity entry in the calculations table as having a maximum level value;
  selecting every entity entry in the calculations table whose level value is one less than the maximum level value, until at most R number of entity entries are selected; and
  creating, for each of the selected entity entries, a respective relationship entry in the relations table between the selected entity entry and the first entity entry.

18. The system of claim 17, further comprising:
  selecting every entity entry in the calculations table whose level value is two less than the maximum level value; and
  creating, for each of the selected entity entries, a respective relationship entry in the relations table between the selected entity entry and one of the entity entries whose level value is one less than the maximum level value,
  wherein the relationship entries are distributed so that none of the entity entries whose level value is one less than the maximum value is related to more than R of the entity entries whose level value is two less than the maximum level value.

* * * * *